Figure 1:
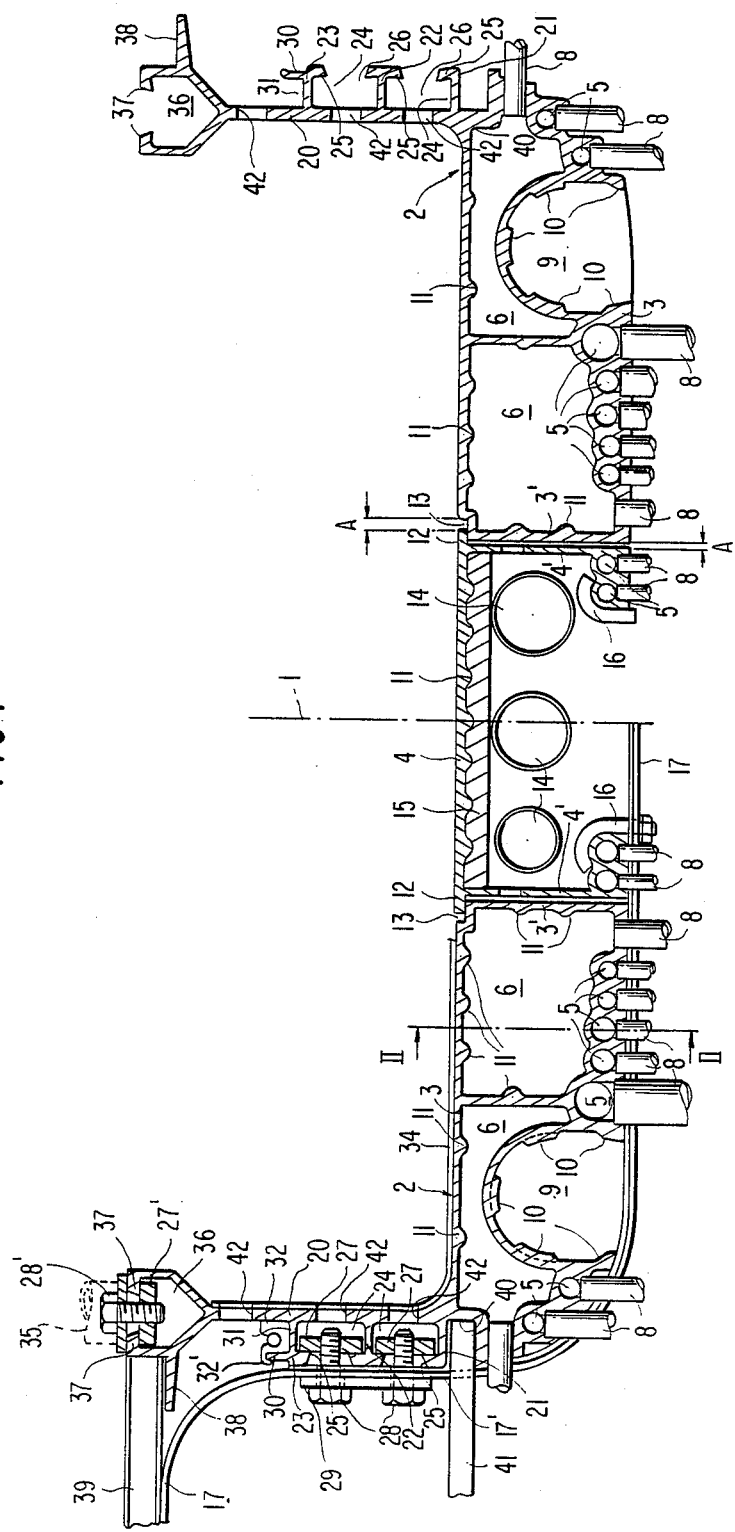

United States Patent [19]

Förster et al.

[11] Patent Number: 4,518,196
[45] Date of Patent: May 21, 1985

[54] MOTOR VEHICLE WITH INTEGRALLY FORMED HYDRAULIC AND/OR AIR LINES

[75] Inventors: Alfred Förster, Weinstadt; Willi Geyer, Oberboingen; Leo Kober, Weinstadt, all of Fed. Rep. of Germany

[73] Assignee: Daimler-Benz AG, Fed. Rep. of Germany

[21] Appl. No.: 367,079

[22] Filed: Apr. 9, 1982

[30] Foreign Application Priority Data

Apr. 9, 1981 [DE] Fed. Rep. of Germany ....... 3114403

[51] Int. Cl.³ ............................................. B62D 33/00
[52] U.S. Cl. .................................. 296/204; 296/208; 138/115
[58] Field of Search ................ 296/208, 204; 138/115, 138/111; 52/220, 221; 280/782

[56] References Cited

U.S. PATENT DOCUMENTS

| | | | |
|---|---|---|---|
| 3,243,201 | 3/1966 | Bock | 296/208 |
| 3,331,433 | 7/1967 | Hagberg | 296/208 |
| 3,455,595 | 7/1969 | Wessells | 296/208 |
| 3,499,678 | 3/1970 | Richler | 296/208 |
| 3,805,847 | 4/1974 | Manning | 138/115 |
| 3,903,929 | 9/1975 | Mock | 138/115 |

Primary Examiner—Robert R. Song
Attorney, Agent, or Firm—Craig and Burns

[57] ABSTRACT

A line network for at least one of hydraulic and pneumatic media with the line network being adapted for use in motor vehicles such as buses as well as in aircraft, machines, or buildings. The line network is formed by extruded sections or members instead of conventional individual lines with each or the sections of members including a plurality of tubular enclosed sections which define the lines as well as chambers or reservoirs for accommodating pneumatic and hydraulic media or the like. Connection to the lines and/or chambers can be accomplished throughout the entire length of the extruded members or sections. The extruded members or sections may be formed from aluminum, aluminum alloys, and, in certain applications, of a plastic material.

25 Claims, 2 Drawing Figures

MOTOR VEHICLE WITH INTEGRALLY FORMED HYDRAULIC AND/OR AIR LINES

The present invention relates to a motor vehicle construction and, more particular, to a bus or van construction provided with hydraulic and/or air lines connecting components arranged in front and rear areas of the motor vehicle.

Buses in particular require, in addition to brake lines, a comprehensive conduit network for operation of air-conditioning systems, heating systems, servomotors, and the like.

As can readily be appreciated, since a large number of hoses, tubes, or conduits are required in motor vehicles such as busses or vans, and since a considerable number of the hoses or tubes must be installed and fastened to the vehicle chassis in a protected and vibration proof manner, the manufacturing costs associated with the installation of the hoses, tubes, or conduits is undesirably high.

The aim underlying the present invention essentially resides in providing a motor vehicle construction, especially a bus or van construction, wherein the line or conduit network for the hydraulic fluids and/or air lines may be constructed at considerably reduced manufacturing costs.

In accordance with advantageous features of the present invention, one or more extruded sections are provided, extending in a longitudinal direction of the vehicle from the front to the rear thereof, with a plurality of tubular closed sections forming gas, air, fluid, or hydraulic lines.

Since, in accordance with the present invention, one extruded section may enclose a plurality of lines or conduits or an entire bundle of lines or conduits, the provision of a single extruded part may often be sufficient to carry all of the lines or conduits running the length of the vehicle. In this manner, it is possible, practically without any additional expense, to install additional lines in an already manufactured vehicle, which are only required when the vehicle is to be specially equipped, so that a refitting or retrofitting is possible at any time.

Advantageously, in accordance with further features of the present invention, the individual lines, tubes, or hoses, may be tapped into at any point of the extruded section as necessary, whereby the feeders extending from the point at which they are tapped to the respective component, which may be either a consumer or supply source, may be constructed so as to be relatively short in length. Likewise, it is possible for plug-in connections, threaded bushings, or the like to be utilized as taps between the feeders and individual lines.

By virtue of the features of the present invention, the extruded sections permit a compact sturdy arrangement of lines, tubes, or hoses combined with a corresponding saving of space resulting in increased useful area within the vehicle usable as, for example, beggage compartments in buses.

Furthermore, by virtue of the mechanical stability, the extruded sections may, for example, be installed without coverings and therefore remain readily accessible for connection of the additional assemblies and for visual checks.

Preferably, in accordance with the present invention, provision is made for installing essentially plate-shaped extruded sections, equipped with parallel upper and lower sides, in a frame area or on top of or beneath the floor of the vehicle, with the sections extending lengthwise of the vehicle thereby resulting in a smooth, accessible, and especially compact and protected arrangement.

Advantageously, tubular enclosed areas having narrow cross sections may be disposed in extruded sections, with the tubular cross sections serving as the lines, conduits, or hoses. Larger cross section areas may be provided in the extruded sections, with such larger section areas serving as reservoirs or chambers for pneumatic or hydraulic media. By virtue of these constructional features of the present invention, the provision of conventional separately mounted pressure vessels such as those required, for examlple, for air brakes, or the like, is rendered superflous. As can be appreciated, by dispensing with the need for separately mounted pressure vessels, there can be a considerable reduction in the manufacturing costs along with a simultaneous improvement in the overall utilization of the space in the vehicle. This last mentioned advantage may be achieved because the chambers provided in the extruded sections, by virtue of the space available in the longitudinal direction, require only the space remaining in conventionally mounted line or hose bundles between the separate lines, even in the case of larger chamber volumes.

In accordance with still further features of the present invention, continuous channels, open on one side, may be formed in the extruded sections and extend lengthwise of the vehicle, with the continuous channels being adapted to accept rod parts such as, for example, shift rods as well as separately installed cables or lines. By virtue of such constructional features, it is possible to install thermally insulated lines for cooling or heating media in order to, first, maintain heat losses at a low level and, second, to avoid considerable thermal stresses in the extruded sections.

Theoretically, the extruded sections constructed in accordance with the present invention may be mounted anywhere in the vehicle by, for example, using clips or the like.

It is also possible in accordance with the present invention, to form flange-like surfaces or plates on the extruded sections. Additionally, mounting sections such as angle strips and/or trough sections may be provided, with the trough sections having edge ribs facing one another and partially overlapping. A slot tapering toward a grooved section may be left between the ribs and nuts or the like may grip beneath the edge ribs and may be disposed anywhere in the troughs along the extruded section. The nuts being adapted to accommodate threaded fasteners.

Preferably, in accordance with the present invention, the extruded sections are disposed as portions supporting or assisting in supporting assemblies built into or on top of the vehicle in order to advantageously utilize the carrying capacity of the extruded sections. For example, the extruded sections may hold or help hold the floor in the passenger compartment in buses or vans.

Particularly in bus construction, which generally employ very extensive line or hose networks, it is advantageous to dispose a plurality of the extruded sections for a simplified construction whereby the extruded sections are preferably mounted on both sides of a longitudinal axis of the vehicle and symmetrically disposed with respect to one another. A third extruded section is advantageously disposed between the laterally disposed extruded sections, with the third extruded section partially overlapping the laterally disposed extruded sections and mounting the same to a support. Advantageously, the third extruded section is disposed with a lateral play in order to enable a compensation for thermal expansion or the like.

In order to increase a carrying capacity, in accordance with still further features of the present invention, the angular extruded sections may be disposed on both sides of the longitudinally extending axis of the vehicle, with one leg of the profiles formed by the extruded sections, in buses or the like, extending approximately horizontally and serving as a floor and/or floor support for a recessed or depressed aisle, with the other leg running approximately vertically to support elevated floor areas to either side of the aisle.

For enabling a mounting of seats, advantageously, in accordance with further features of the present invention, trough sections may be formed on the extruded sections and, preferably, along an upper edge of the verticaly extending leg of the profiled extruded sections, the troughs may be combined, if desired, with flange areas facing away from the side of the vehicle, which may serve as a floor support or the like.

In order to enable a ventilation of an interior of the vehicle, openings may be provided in the extruded sections in an area preferably in the vertically extending leg portions.

While the above noted line arrangements or network may be primarily advantageous for vehicle constructions, they are not limited to such applications and, for example, a similar arrangement is possible in machinery as well as buildings such as, for example, scientific laboratories. Consequently, the scope of the present invention covers not only the vehicle construction but also the additional arrangements for line arrangements which are constructed as extruded sections with a plurality of tubular enclosed sections.

Advantageously, in accordance with the present invention, the tubular sections may be sealed at the ends of the extruded sections by, for example, hard soldered end covers or bottom members.

Depending upon the specific requirements, advantageously, by virtue of the present invention, connections may be provided approximately at right angles to an axis of the tube, anywhere along the tubular sections, and, also, the bottom members or covers sealing off the ends of the extruded sections may also be provided with appropriate connections.

Accordingly, it is an object of the present invention to provide a hydraulic and/or pneumatic line system or network which avoids, by simple means, shortcomings and disadvantages encountered in the prior art.

Another object of the present invention resides in providing a hydraulic and/or pneumatic line system or network which is simple in construction and therefore relatively inexpensive to manufacture.

Yet another object of the present invention resides in providing a hydraulic and/or pneumatic line system or network which is not only suited for motor vehicles such as buses or vans but is equally applicable to other vehicles such as aircraft as well as building construction.

A further object of the present invention resides in providing a hydraulic and/or pneumatic line system or network which is adapted to handle all types and temperatures of media.

A still further object of the present invention resides in providing a hydraulic and/or pneumatic line system or network which is extremely compact.

Another object of the present invention resides in providing a hydraulic and/or pneumatic line system or network which enables a connecting or tapping of the system or network virtually anywhere along the length thereof.

Figure 2:
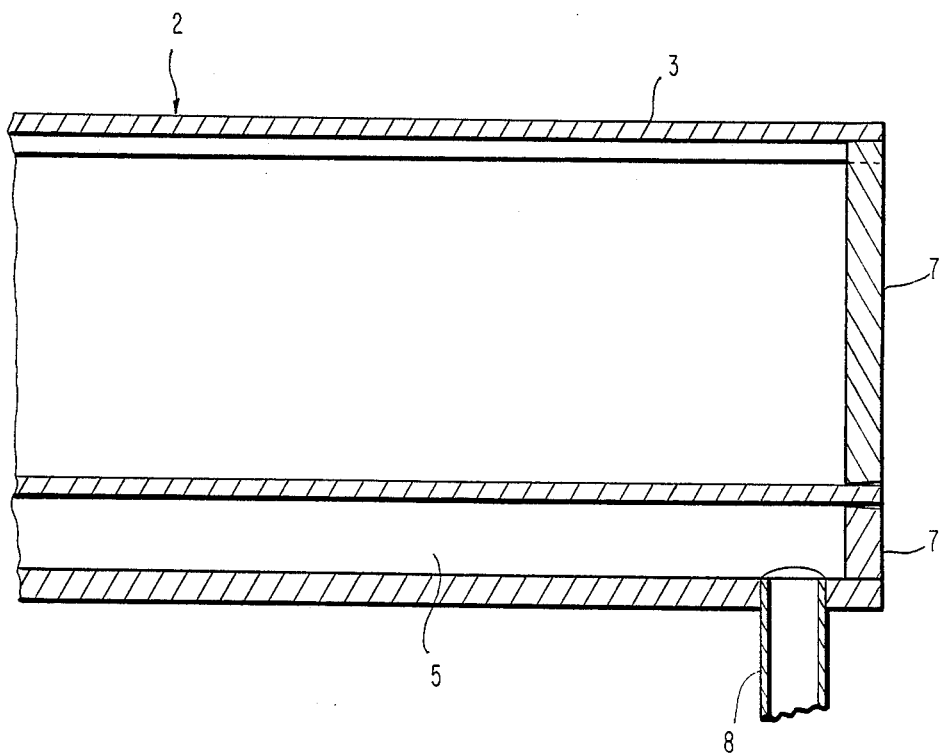

These and other objects, features, and advantages of the present invention will become more apparent from the following description when taken in connection with the accompanying drawings which show, for the purposes of illustration only, one embodiment in accordance with the present invention, and wherein:

FIG. 1 is a cross sectional view of a hydraulic and/or pneumatic line system or network disposed as part of an aisle system of a bus and formed of extruded sections constructed in accordance with the present invention; and FIG. 2 is a longitudinal cross sectional view taken along the line II—II in FIG. 1.

Referring now to the drawings wherein like reference numerals are used in both views to designate like parts and, more particularly, to FIG. 1, according to this figure, angular extruded sections generally designated by the reference numeral 2 are disposed symmetrically with respect to a vertical plane 1 extending longitudinally of the vehicle, with the angular extruded sections 2 being formed as profiled elements having essentially horizontally extending box-shaped legs 3 between which is disposed a box-shaped central extruded section 4 which is open toward the bottom.

The extruded sections 2, 4 extend from the front to the rear of the vehicle and serve to link various assemblies together by lines or conduits 5. The lines 5 are molded or formed in a multiple arrangement on an underside of the extruded sections 2, 4 as integral parts thereof. Chambers 6 are provided above the lines 5 in the horizontally extending legs of the angular extruded sections 2. As shown most clearly in FIG. 2, the lines 5 as well as the chambers 6 are sealed at the ends of the extruded sections by bottom members or end covers 7 which are fixedly soldered to the extruded sections 2, 4. The tubes 5 or chambers 6 are adapted to be connected to vehicle assemblies and subassemblies in a conventional manner by appropriate connections (not shown) and by way of connectors 8 which are adapted to be disposed at any point along the extruded sections 2, 4.

The lines 5 serve primarily for transporting fluids such as hydraulic media or the like, or gases, such as a pneumatic media, with the chambers 6 serving as fluid reservoirs or, preferably, for pneumatic media, e.g., the chambers 6 may be utilized, in particular, as compressed air chambers, so that separately mounted pressure vessels, i.e., air tanks, are superflous.

Trough-shaped recesses 9 are provided in the box-shaped horizontally extending legs 3 of the angular extruded sections 2, with the recesses 9 having an essentially circular cross section and serving, for example, in buses with rear engines, to accommodate a shift rod, or a cable set for an electrical system of the vehicle. Longitudinally extending ribs are formed in the trough-shaped recesses 9, with the ribs 10 serving first to stiffen or reinforce the recesses and second to hold retainers for the shift rods or cables. Similar longitudinally extending ribs 11 are provided for stiffening or reinforcing the chambers 6.

The central extruded section 4 is, as noted above, open at the bottom, and has laterally projecting ribs or flanges 12 on an upper surface thereof, with the ribs 12 being adapted to overlap the horizontally extending legs 3 of the angular extruded sections 2 at stepped-recesses 13. Thus, the upper surface of the central extruded section 4 lies in a same plane as a top surface of the horizontally disposed leg 3 of the angularly extruded section 2. A gap or play A is provided between the ribs 12 and vertical legs of the stepped-shaped recesses 13 and between lateral surfaces 3' of the horizontally disposed legs 3 and lateral surface 4' of the middle extruded section 4 so as to enable a compensation for thermal stresses, dimensional variations, or the like.

The center section 4 is preferably suited for accommodating lines 14 to be separately mounted, with the lines 14 being adapted to carry, for example, coolant or water for a vehicle heating and cooling system. Since the lines 14 may carry coolant or water, the lines 14 are exposed to relatively severe heat stresses and, if desired, a thermal insulation may be provided within the central extruded section 4, especially along an upper surface thereof.

Th central extruded section 4 serves partially to support or hold the lateral annular extruded sections 2 and, for this purpose, the lines 5 in the central extruded section 4 are disposed or formed at shoulders, located oppostie one another on the lateral surfaces 4' of the central extruded section 4. The tubular lines 5 are anchored to a bottom floor or support member 17 through stepped clamps gripping the tubular lines 5. The bottom or support member 17 may, for example, be a cross member or, as illustrated in FIG. 1, a pan-shaped bottom panel. The stepped clamps 16 and shoulders ensure that, as illustrated in FIG. 1, the horizontal legs 3 of the annular extruded sections are non-displacably gripped in a vertical direction between the support member 17 and the flanges or ribs 12.

The angular extruded sections 2 are provided with vertically extending ribs or legs 20 which provided for further fastening of the angular extruded sections 2, 4 to the bottom or support member 17. Angular or T-shaped sections 21, 22, 23, are formed on the vertically extending ribs or legs 20 and are arranged so as to face toward a side of the vehicle. Troughs 24 are defined between the angular or T-shaped sections 21, 22, 23, with the troughs 24 being partially covered by edge ribs 25 which face one another and which define slots 26. Fastening means such as nuts 27 may be inserted in the troughs 24, with the nuts having a cross or transverse dimension which corresponds to a width of the slot 26 and a length dimension which is greater than a width of the slot 26. When the nuts 27 are properly installed in the trough 24, nuts 27 grip beneath the edge ribs 25 so that the edge ribs may be clamped by means of threaded members such as bolts 28, possibly with an interposition of washers 29, with lateral surfaces 17' of the bottom or support member 17 of, for example, a floor pan. As shown in FIG. 1, the edge ribs 25 are slightly undercut on an interior side with the nuts 26 having a corresponding shape on a side which faces the edge ribs 25 so that a certain centering effect and a form fitting closure can be achieved.

The T-shaped section 23 forms a U-shaped groove 31 between a rib-like edge area 30 and the vertically extending leg or rib 20 of the angular extruded section 2. A rod or the like may be inserted into the groove 31 and may be clamped by the spring action of retainers 32.

The retainers 32 then fit around the slightly outwardly bent edge of the rib-like edge area 30 by means of a spring part 32'.

As shown in FIG. 1, the extruded sections 2, 4 compliment a pan 17 which forms, for example, an aisle of a bus. Accordingly, a floor covering 34 may be provided on the extruded sections 2 and 4, which floor covering 34 may be selected to match an interior design of the vehicle and need not assume any supporting functions whatsoever due to the mechanical strength of the extruded sections 2, 4.

Seats (not shown) disposed on the sides of the aisle may be fastened with their legs 35 (shown in phantom), toward the aisle, in trough sections 36 formed on upper edges of vertical legs 20 of the angular sections 2. Since the trough sections 36 are continuous, the seats facing along the length of the vehicle may be positioned at will. The seat legs 35 may be fastened in the trough sections 36 by fasteners such as nuts 27' and bolts 28' which may correspond to the nuts 27 and bolts 28 utilized for fastening the vertically extending rib or leg 20 to the base 17, and cooperate with trough sections 26 with edge ribs 37, which correspond to edge ribs 25 on the sections 21, 22, 23, as described hereinabove.

Flanged areas 38 are arranged on the trough sections 37 on the outside of the vertical extending ribs or legs 20 of the angular extruded sections 2. The flanged areas 38 serve as a support for floor panels 39 disposed beneath the vehicle seats and for a mounting of the floor panels 39 by bolts or the like.

A U-shaped groove 40 is disposed on an outside of the angular extruded section 2, with the groove serving to hold a subfloor 41, whereby a space between the subfloor 41 and floor panels 39 is suitable for conducting exhaust air expelled from the interior of the vehicle through openings 42 provided in the vertically extending ribs or legs 20 of the extruded sections 2.

In the illustrated example of FIG. 1, a long distance bus with depressed aisle and seats elevated with respect thereto is illustrated; however, if desired, an arrangement with a completely flat floor is also possible. For this purpose, only the vertically extending ribs or legs 20 need be omitted so that the subfloor 41 forms a continuous surface with the tops of the horizontally disposed legs 3 of the extruded sections 2 and middle extruded section 4.

In situations wherein a recessed aisle is utilized, such as, for example, for entrances, baby carriage areas, and standing areas, when most of the vehicle floor is flat, the vertically extending rib or legs 20 may also be constructed as a separate part and used for partial elements such as, for example, wheel well pedestals. The separate part may be attachable by a snap connection to the horizontally disposed legs 3 of the extruded sections 2.

In order to compensate for differences in the width of areas within which the sections 2, 4 are to be installed, the middle extruded section 4, which has an especially simple construction, may be manufactured in different widths, if desired, so as to permit the more complexly designed lateral extruded sections 2 to be installed in the same manner unchanged.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A line network arranged in a motor vehicle for at least one of hydraulic and pneumatic media, the line network comprising at least one extruded member having a predetermined length extending from a front to a rear area of the motor vehicle, a plurality of enclosed areas formed in the at least one extruded member for defining lines for accommodating the media, said at least one extruded member including enclosed areas of larger cross section defining reservoirs for accommodating the media, said at least one extruded member including at least one channel means open on one side and extending in a longitudinal direction of the extruded member for accommodating at least one of a plurality of elongated members, at least one support means formed as one of a plate and a flange surface on the at least one extruded member for enabling a support of a component of the vehicle.

2. A line network for a vehicle for at least one of hydraulic and pneumatic media, the line network comprising at least one profiled element forming a portion of a said vehicle and extending substantially the length of the vehicle, said profiled element being formed as a generally box-shaped extrusion having a side associated with a surface of said portion of said vehicle and a plurality of enclosed tubular sections formed in a portion of the box-shaped extrusion spaced from said side, said enclosed tubular sections defining lines for accommodating the media.

3. A line network for at least one of hydraulic and pneumatic media, the line network comprising at least one extruded member having a predetermined length, a plurality of enclosed tubular sections formed in the at least one extruded member for defining lines for accommodating the media, said at least one extruded member including at least three extruded members, two of the extruded members being symmetrical to one another and disposed on respective sides of a longitudinal center axis of the motor vehicle, the third extruded member being arranged between said two extruded members, means for mounting the three extruded members to a support member of the vehicle with one of said at least three extruded members providing for lateral play, the means for mounting the three extruded members including laterally projecting rib means provided on the extruded member arranged between the two extruded members and recess means provided on the two extruded members for accommodating the rib means.

4. A line network according to claim 1, wherein the at least one extruded member is substantially plate shaped and includes substantially parallel upper and lower surfaces.

5. A line network according to claim 1, including means for sealing respective ends of the enclosed areas at respective ends of the at least one extruded member.

6. A line network according to one of claims 1 or 5, including means for enabling a connection between at least one of the enclosed areas and reservoirs substantially at a right angle to a longitudinal axis of the at least one extruded member.

7. A line network according to claim 6, wherein the at least one extruded member is made of at least one of a plastic, aluminum, and aluminum alloy.

8. A line network according to claim 3, wherein the line network is arranged in a motor vehicle and the at least one extruded member extends from a front to a rear area of the motor vehicle.

9. A line network according to claim 8, wherein at least one extruded member of the at least three extruded members includes at least one channel means open on one side and extending in a longitudinal direction of the at least three extruded members for accommodating at least one of a plurality of elongated members.

10. A line network according to claim 9, wherein the elongated members include at least one of shift rods and cables.

11. A line network according to claim 9, wherein at least one extruded member of the at least three extruded members includes at least one support means for enabling a support of a component of the vehicle.

12. A line network according to claim 11, wherein the at least one support means is formed as one of a plate and a flange surface.

13. A line network according to claim 11, wherein at least one mounting means is provided on at least one extruded member of the at least three extruded members for enabling a mounting of vehicle components thereto the at least one mounting means includes trough means for accommodating mounting members, the trough means includes spaced edge rib means facing one another for defining a slot therebetween.

14. A line network according to claim 13, wherein the at least one extruded member forms at least a partial support element for components built into and onto the vehicle.

15. A line network according to claim 14, wherein the components include a floor member disposed in an interior of the motor vehicle.

16. A line network arranged in a motor vehicle for at least one of hydraulic and pneumatic media, the line network comprising at least one extruded member having a predetermined length extending from a front to a rear area of the motor vehicle, a plurality of enclosed areas formed in the at least one extruded member for defining lines for accommodating the media, said at least one extruded member including enclosed areas of larger cross section defining reservoirs for accommodating the media, said at least one extruded member including at least three extruded members, two of the at least three extruded members being symmetrical to one another and disposed on respective sides of a longitudinal center axis of the motor vehicle, a third extruded member of the at least three extruded members being arranged between said two extruded members, means for mounting the at least three extruded members to a support member of the vehicle with one of said at least three extruded members providing for lateral play.

17. A line network according to claim 16, wherein the means for mounting the at least three extruded members includes laterally projecting rib means provided on the extruded member arranged between the two extruded members and a recess means provided on the two extruded members for accommodating the rib means.

18. A line network according to claim 17, wherein each of the two extruded members disposed on respective sides of the center axis of motor vehicle includes a first portion extending approximately horizontally and a substantially vertically extending portion for forming a support for components of the motor vehicle.

19. A line network according to claim 18, wherein upper surfaces of the first portions of the two extruded members and an upper surface of a remaining extruded member are arranged in substantially the same plane such that the extruded members form a floor for the motor vehicle.

20. A line network according to claim 19, wherein the floor forms an aisle in the motor vehicle, and the subtantially vertically extending portions support an elevated floor arranged on respective sides of the aisle.

21. A line network according to claim 20, including means along an upper edge of the substantially vertically extending portions for enabling an anchoring of seats to the respective extruded members, flange means on the substantially vertically extending portions for forming a floor support for the motor vehicle.

22. A line network according to claim 20, wherein means are provided on each of the substantially vertically extending portions for enabling a mounting of the at least three extruded members to a support part of the motor vehicle including at least one trough means for accommodating mounting members, and means in the at least one extruded member for enabling a venting of an interior of the vehicle.

23. A line network for at least one of hydraulic and pneumatic media, the line network comprising at least one extruded member having a predetermined length, a plurality of enclosed tubular sections formed in the at least one extruded member for defining lines for accommodating the media, said at least one extruded member including an extruded member disposed on respective sides of the central longitudinal axis of a vehicle, each extruded member including a first portion extending generally horizontally and a substantially vertically extending portion for forming a support for components of the vehicle, each vertically extending portion of each extruded member including a trough section being adapted to anchor vehicle seats, and flange means for supporting a vehicle component such as a floor.

24. A line network according to claim 23, wherein each vertically extending portion of each extruded member includes means for venting the interior of the vehicle.

25. A line network according to claim 16 wherein the at least one extruded member is substantially plate shaped and includes substantially parallel upper and lower surfaces.

* * * * *